(12) United States Patent
Strange et al.

(10) Patent No.: US 8,478,626 B2
(45) Date of Patent: Jul. 2, 2013

(54) SYSTEMS, METHODS, AND SOFTWARE FOR MANAGING PROGRAMS, PROJECTS, AND VARIOUS ASPECTS THEREOF

(75) Inventors: Sterling T. Strange, Warrenton, VA (US); Steven C. Peacock, Orlando, FL (US)

(73) Assignee: The Solution Design Group, Inc., Warrenton, VA (US)

( * ) Notice: Subject to any disclaimer, the term of this patent is extended or adjusted under 35 U.S.C. 154(b) by 271 days.

(21) Appl. No.: 12/696,501

(22) Filed: Jan. 29, 2010

(65) Prior Publication Data

US 2011/0191137 A1    Aug. 4, 2011

(51) Int. Cl.
*G06Q 10/00* (2012.01)

(52) U.S. Cl.
USPC .......... 705/7.25; 705/7.12; 705/7.13; 705/35; 705/36

(58) Field of Classification Search
USPC ........................... 705/7.12, 7.13, 7.25, 35, 36
See application file for complete search history.

(56) References Cited

U.S. PATENT DOCUMENTS

| | | | | |
|---|---|---|---|---|
| 2005/0289051 | A1* | 12/2005 | Allin et al. | 705/40 |
| 2006/0015421 | A1* | 1/2006 | Grimberg | 705/35 |
| 2006/0143103 | A1* | 6/2006 | Denne et al. | 705/35 |
| 2007/0233541 | A1* | 10/2007 | Schorr et al. | 705/8 |
| 2007/0288364 | A1* | 12/2007 | Gendler | 705/39 |
| 2008/0114630 | A1* | 5/2008 | Chang et al. | 705/7 |
| 2008/0243712 | A1* | 10/2008 | Clegg et al. | 705/36 R |

OTHER PUBLICATIONS

Primavera Expedition Contract Control Software [hereinafter Primavera], as evidenced by User's Guide, Version 6.0, 1998, p. 1-434.*
Reference Manual, Primavera P6 Project Management, 2007, p. 1-529.*
City of Houston, Fixed Asset Accounting and Management Procedures Manual, Revision 4, Feb. 3, 2005, p. 89-98.*

* cited by examiner

*Primary Examiner* — Justin M Pats
(74) *Attorney, Agent, or Firm* — Pillsbury Winthrop Shaw Pittman LLP (57) ABSTRACT

Systems, methods and software applications for managing programs, projects, and various aspects thereof. A program may include a number of related aspects, such as, assets, contracts, projects, entities, and funding sources. Users may select one or more projects to be grouped as a program. The systems, methods, and software may use a program management application that is configured to provide users with tools for effectively managing programs and projects that may be fully or partially funded from one or more funding sources.

32 Claims, 8 Drawing Sheets

| Program | 410 |
|---|---|

| Name 412 | First Safety Improvement | 416 Description |
| Status 413 | Active | Program to upgrade equipment and firs stations |
| Manager 414 | Steve C Peacock | |
| Duration 415 | 3 Year(s) | |

Dates 420

| Type | Date |
|---|---|
| 422 | 424 |

Delete ☐ Edit ☐ Add ☐
426

Projects 430

| Project | Priority | Description | Estimates | Funding |
|---|---|---|---|---|
| 432 | 433 | 434 | 435 | 436 |

Delete ☐ Edit ☐ Add ☐
438

Attachments 440

Comments 450

Funding Draw 510

| | |
|---|---|
| Local ID 512 | Q4 2009 |
| Status 513 | Completed |
| Source 514 | Available Expenses |
| Date 515 | 24 August 2009 |
| Amount 516 | $47,118.07 |

| | |
|---|---|
| Submit Date 517 | |
| Description 518 | |

519

| | |
|---|---|
| Draw Total | $47,118.07 |
| Refunded Amount | $0.00 |
| Available Funds | $11,952,882 |

Funding Draw Expenses 520

| Type | Invoice/Project # | Date | Line No. | Description | Draw Amount |
|---|---|---|---|---|---|
| 522 | 523 | 524 | 525 | 526 | 527 |

Attachments 530

Comments 540

Figure 7

SYSTEMS, METHODS, AND SOFTWARE FOR MANAGING PROGRAMS, PROJECTS, AND VARIOUS ASPECTS THEREOF

FIELD

This application generally relates to systems, methods, and software for managing programs, projects, and various aspects thereof.

BACKGROUND

Large capital expenditure programs, such as, the construction of a new terminal for an airport, a roadway, or the replacement of a water distribution system, are usually funded from a variety of sources such as federal and state grants, bonds, and local funds. Typically, there are many multi-level dependencies between the funding sources (such as matching shares) that must be enforced and guaranteed in order to secure funding.

However, it is very difficult to coordinate the acquisition of funds, the distribution of funds, the compilation of compliance and audit documentation, and the tracking on asset status once the project is complete. Typically, these tasks rely of human management of disparate tools like spreadsheets, word processors, and schedules.

SUMMARY

According to an aspect of the invention, users may define a program. A program may include a number of related aspects, such as, assets, contracts, projects, entities, and funding sources.

According to an aspect, systems, methods, and software enable users to manage programs, projects, and various aspects thereof.

According to an aspect, various information related to programs, assets, contracts, projects, entities, and funding sources may be contained in a repository with access for authorized users.

According to an aspect, the systems, methods, and software may use a program management application that is configured to provide users with tools for effectively managing programs, and projects, which may be fully or partially funded from one or more funding sources. The program management application may include a plurality of modules. These may include, for example, a project module, a contract module, a funding module, an asset module, an entity module, an allocate module, a reporting module, and a tools module.

According to an aspect, users may select one or more projects to be grouped as a program. Each project may be separately tracked and managed.

According to an aspect, contracts that are associated with a program may also be tracked and managed.

According to an aspect, users may track multiple types of funding sources associated with a program. Draws against each funding source may be tracked.

According to an aspect, users may allocate expenses across multiple projects.

According to an aspect, users may track and manage assets. And, at the end of a project, the project may be converted to an asset, which can then be tracked and managed as an asset.

According to an aspect, various entities, whether organizations or individuals, may be associated with a program or a project.

According to an aspect, a variety of reporting functions may be provided. Users may have options to select one or more reports. In addition, customizable and ad hoc reports may be generated by users, as necessary.

According to an aspect, users may be provided with various other tools and functionalities for tracking projects and programs. These may include, among other, forecasting and planning tools.

These and other aspects of the invention will be apparent from the following detailed description.

DETAILED DESCRIPTION

Systems, methods, and software are provided for the management of programs and projects. These enable users to manage and track various aspects of a program and its projects, from conception through completion.

Users may include one or more individuals or an organization and its employees or agents. User organizations may be governments, businesses and non- and not-for-profit organizations. For example, the systems, methods and software disclosed herein may be used by a finance department of an organization and/or a project manager. These users may also be tasked with data entry and manipulation of data.

Figure 1:
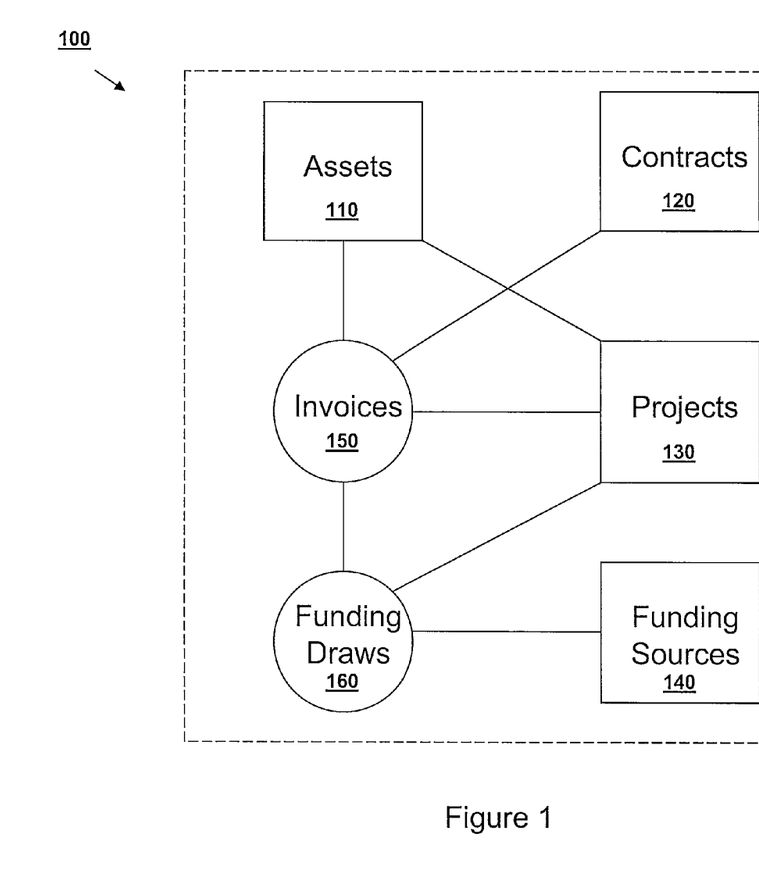
FIG. 1 illustrates a schematic of an exemplary program according to an aspect.

FIG. 1 illustrates a schematic of an exemplary program 100 according to an aspect. A program 100 may include a number of related aspects, such as, assets 120, contracts 120, projects 130, and funding sources 140. Other entities (i.e. originations or persons) may also be involved. These aspects may be related to common funding source(s) for reporting and planning purposes. In addition, programs may involve payment of one or more invoices 150 associated with a program or project. These payments may by satisfied by funding draws 160 from one or more of the funding sources 140.

Programs 100 may include capital improvement programs (CIP). These may include, for example, aviation, transportation, and government constructions or procurement programs. Of course, other programs may be managed and tracked also, as disclosed herein.

Assets 110 may include capital assets, purchases, or the like. Generally, these are items that have some value, and may, for accounting purposes be consider an asset, rather than a liability. Projects 130 may be converted to assets over their lifecycle.

Users or entities may enter into a contract 120 with one or more other users or entities. Typically, each program or project may have one or more contracts 120 associated with it. Contracts 120 may include obligations, or other agreements related to purchasing and/or procuring goods and service from a person or an entity related to a project or program.

Program 100 may include one or more projects 130. Users may select one or more projects to be grouped together as a program. Projects 130 may include construction programs or purchases made by an organization. Examples of projects may include, for instance, construction of a building, or acquiring a fire truck. These may be large enough to qualify as a capital expenditure.

Each project may be funded from one or more funding sources 140. Funding sources 140 may include various source of money. Funding may come from a variety of sources, such as, for example, grants from Federal, State, and/or local government, bond sales, Public Financial Corporation (PFC), loans, venture capital, or other source of financing. In the airport industry, for instance, funding may come from Transportation Security Administration (TSA) grants, Airport Improvement Program (AIP) grants, State Department of Transportation (DOT) grants, collections, bonds and airport funds, etc.

Typically there may not be a one-to-one relationship between funding sources and projects. For instance, it is not uncommon for a single funding source to fund more than one project, and for more than one program. Each funding source may have its own unique set of rules that are associated with it regarding funding draws.

Projects 130 may include purchases (i.e., expending money for the procurement of goods). The purchasing process may include requisition (i.e., a request to expend funds— also known a "pre-encumbrance"); and a purchase order issued to a vender for goods or service (also known an "encumbrance").

Invoices 150 may be generated from entities (or on their behalf) for payments for providing goods or services for a program 100 or a project 130. Invoices 150 may be printed and sent and/or electronically generated and transmitted, for instance, by electronic mail from an entity to the user. Invoices 150 may breakdown goods and services rendered, and report them separately on the invoice as different invoice line numbers.

A draw is a disbursement of funds. This may also be known as an expenditure. Funding draws 160 may be taken from funding sources 140 to help fund various aspects of programs 100 or projects 130. These may include various payments to satisfy invoices 150. In addition, a draw may be made to satisfy bond payments or other financing obligations. A draw 160 may take place when a user (typically a program manager) makes a request of an administrator of the funding source for funds to be disbursed. Each funding source 140 may require that draws 160 be made by providing documentation that supports the expenditure. The draw may have to conform to the rules of the funding source before a disbursement can be made. As a general rule, the expenditures, for instance, in the form of invoices that have been received are matched to the funding sources that contribute to the payment of that expense, until 100% of the invoice(s) is accounted for. This information is provided to the funding source administrator to support the draw requests.

The systems, methods and software disclosed herein may be configured to track one or more programs and projects and provide detailed information regarding its purpose, costs, budgets, funding, and contractual and other requirements. In addition, the systems, methods and software may track the progress and status of a program in relation to funding, and payment, along with the projects, assets, contracts and entities associated with it.

Figure 2:
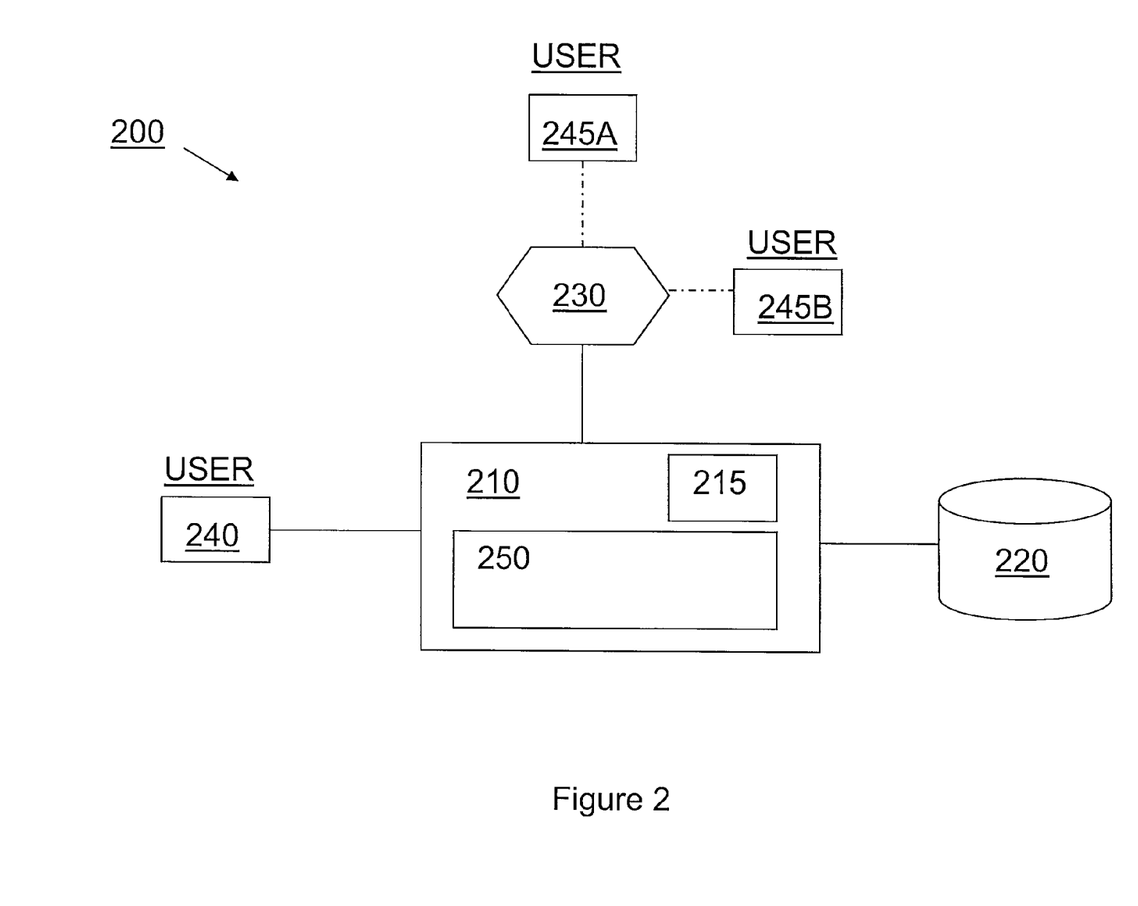
FIG. 2 illustrates an exemplary system architecture for managing programs, projects, and various aspects thereof, according to an aspect.

FIG. 2 is an exemplary system architecture 200 for managing programs, projects, and various aspects thereof, according to an aspect.

The system 200 may include a computing device 210 configured to operate a program management application 250 having a plurality of modules. One or more of the modules or the functionally thereof of program management application 250 may be combined. Additional modules may also be provided. Computing device 210 may include a computer, or server machine, having one or more processors 215 that may be configured, as disclosed herein. For instance, the program management application 250 may be configured for operation on various platforms, such as, for instance, Microsoft-centric servers or Winxx platforms or Java 2 Platform (J2EE).

Program management application 250 may be configured to enable users to define and manage one or more programs, projects, and various aspects thereof. The program management application 250 may interface with one or more additional systems, such as a database 220. Database 220 may be configured to store and associate information related to programs, projects, assets, contracts, entities, and funding source in a centralized repository. Database 220 may, in some implementations, be a relational database, such as, for example, operating Oracle® or SQL®.

In some implementations, the program management application 250 may reside at a server site, or it may be hosted by a third party, and accessed remotely from one or more users via remote clients 245, for instance, via one or more networks 230. In one implementation, network 230 may be wired or wireless networks, such as a LAN, a WAN, the Internet, or combinations thereof. A web-based, or browser-based interface may be used, in some implementations, to access and interact with the program management application 250. Other users 240 may interface directly or locally with the program management application 250. Clients 245 may be computing devices, such as, for example, computers, a personal digital assistances (PDA), hand-held electronic devices, smart phones, etc.

The program management application 250 may be software (or firmware) created using any number of programming languages. Of course, it will be appreciated that any number of hardware implementations, programming languages, and operating platforms (whether proprietary or open-source) may be used. As such, the description or recitation of any specific hardware implementation, programming language, and operating platform herein is exemplary only and should not be viewed as limiting.

The program management application 250 may be stored on a computer- or machine-readable storage media having computer or machine-executable instructions or code executable by the one or more processors 215 stored therein. In one implementation, the software instructions that comprise program management application 250 may reside on, or be associated with, a memory of the computing device 210. The program management application 250 may also be implemented as hardware, such a programmable processor, for example a field-programmable gate array (FGPA) or an application-specific integrated circuit (ASIC) processor.

The program management application 250 may be a stand-alone application or applet, or it may integrate with one or more other systems, such as an enterprise resource planning system, like Oracle® or SAP®; project scheduling system, like Primavera® and Microsoft Project®; or other software applications. In some implementations, the program management application 250 may provide database independence.

Figure 2A:
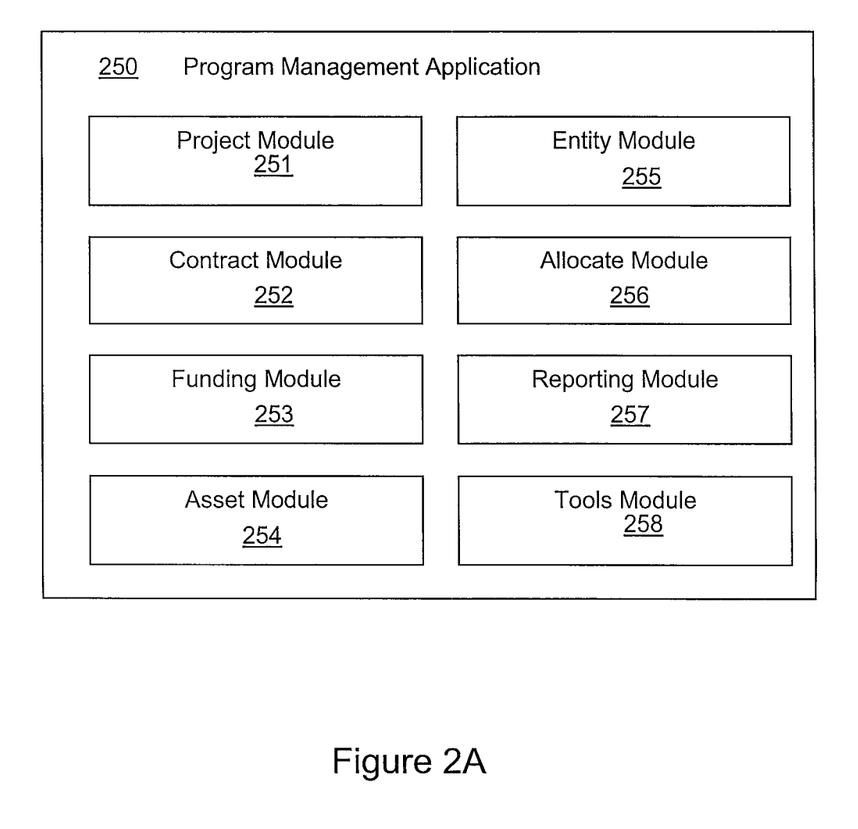
FIG. 2A illustrates one exemplary program management application including a plurality of modules according to an aspect.

FIG. 2A illustrates one exemplary program management application 250, including, but not limited to, a project module 251, a contract module 252, a funding module 253, an asset module 254, an entity module 255, an allocate module 256, a reporting module 257, and a tools module 258. In some implementations, the functionality of one or more modules may be combined, or omitted. Additional modules may be added. For different configurations, the programming may vary.

The project module 251 may be configured to enable users to define and to track and manage one or more projects associated with a program. To track a project, users need information that is descriptive of, and specific to a project. For example, most organizations may refer to a project by some sort of identification (i.e., number) which may be based on a organization-specific identification or numbering scheme. Projects may be classified by a variety of types, such as, for example, construction, design, purchase, etc. Users may define additional project types, as desired.

Project information may be changed, as necessary, throughout its lifecycle (i.e., from its conception or initial stage to its completion or final stage). Each project may have a number of characteristics that may be inputed, edited and tracked. These may include, for instance, core project information, scheduling information, and forecasting and expenditures information. With this information, for instance, a project may by tracked throughout its lifecycle. When it is completed, it may be closed-out, and rolled into a user's asset base.

Core project information may include one or more of the following: (i) project number; (ii) project name; (iii) project description; (iv) justification; (v) project type (e.g., construction, acquisition, etc.); (vi) project manager; (vii) project status; (viii) project summary; and (ix) accounting code(s).

Project module 251 may also be configured to track project schedules. Two types of schedules associated that may be monitored and tracked for projects include: a construction schedule and a financial schedule. Other schedules may also be monitored, as needed. In some implementations, the project module 251 may be configured to import construction and/or financial scheduling information, if available. Scheduling information may be imported, for instance, from other applications, such as Primavera® and MS Project®. This reduces the need for data re-entry. For instance, users may select or identify files, information or other data to import, to map files to the system (e.g., project, funding, invoices, purchaser orders, etc.). Users may receive a summary of the data loading into the system. Otherwise, scheduling information may be input by the user. In addition, the project module 251 may provide users with options to create and/or edit schedules of financial items related to a program or project, such as, for example, payments, grant applications, and other items. Scheduling information may be graphically depicted, for instance, in a calendar or time-line view.

The contract module 252 may be configured to enable users to enter contract information, and to track and manage each contract associated with a program or project.

Contract information may include: the relationship between programs/projects and contracts; the relationship between various entities that may be supplying materials and services on a contract; the tasks that have been permitted to be performed under the contract; the amount of money a contractor has invoiced and for which it has received payment; important dates related to the specific contract; the original monetary terms of the contract; and change orders that are made to the contract. Users may define and input different types of contract statuses, contract dates, contract types, and other features about contracts. Additionally, contract information such as change orders, encumbrances and expenditures, invoices that have been paid, information about contractor and subcontractors, and other key elements that are needed for proactive contract management may be maintained.

For instance, contract types might be for "professional services" and/or "general contractor" contracts. Other contract types may also be defined, as users desire. The contract type may determine which information may be required or appropriate.

The contract module 252 may be configured to permit users to attach or upload documents. For instance, scanned images, photographs, or other files that may be appended to, or associated with a contract, may be stored and accessed also. This may include an electronic copy of contract.

Each contract may have important dates associated with it that may be tracked by the contract module 252. These dates can vary from contract to contract. Moreover, contracts module 252 may track the information regarding the organization or persons that each contract was made with.

When the parties to the contract agree to change the terms of the contract, a change order may be issued. Each contract could have one or more change orders associated with it. The contract module 252 may track the approval and status of all change order associated with each contract. This may include tracking change order identification, the use(s)r who ultimately approved the change order, the total amount of the change order, and/or the effective date of the change order. Change orders may be uploaded and attached by the user.

The funding module 253 may be configured to enable users to enter information regarding one or more funding sources, and to track and monitor events related to funding.

The dates of funding may be tracked for each funding source. Important and key dates may be identified and monitored. The funding module 253 may be configured to generate reminders to the project or program manager(s) or other users of these events. This helps to ensure that projects are proceeding in a timely manner and to ensure that the funding source will reimburse the user for work completed.

Each funding source may have different rules and requirements. For instance, this may include requirements about what documentation is necessary in order to secure funding via that source. Users may be able to attach or upload such documentation. In addition, the funding module 253 may enable users to track requirements of the funding associated with individual projects. This may include not only the source and the amount, but also restrictive requirements, and matching conditions associated with the funding. For example, for disadvantaged business enterprise (DBE) grants, there are specific requirements. In some implementations, funding module 253 may enforce the rules and requirements for each funding source. For instance, the funding module 253 may not permit a user to make a draw until all required data has been input.

There may be various types of funding sources. The type of source may control how the funding source is configured. This may include the data types that are required or optional for the funding source, and/or the program or project types that are permitted for the funding source. The funding module 253 may be configured to match up expenditures (e.g., in the form of invoices) that have been received to the funding source that can contribute to the payment of those expensive.

This may continue until all of the invoices have been accounted for. The funding module 253 may track and enable users to access a funding source's drawing history at any point in time. Once the draw is issued, its status may be continually monitored.

And, there may be various funding dates for each funding source that may be tracked. These may vary from source to source, but may include dates for requests for, and actual disbursements thereof.

Funding module 253 may provide users with options to direct funding sources to release disbursements for subsequent payment to one or more entities. In some implementations, funding module 253 might also instruct the funding source to pay an entity directly. Funding module 253 may also include a transfer module that is configured to enable users to transfer amounts between funding sources. This may handle "refunding," issues which typically occur in many capital programs.

Once the source documents (i.e., generally invoices) have been associated with a draw, the user may be permitted to generate a draw request that provides the necessary information to submit to the funding source administrator. Draws may be electronically generated and transmitted to the funding source. Once the draw document is issued, it should be possible to monitor the status of the draw and determine when the funds were received.

In addition, the funding module 253 may store and track the invoices that have been issued by each organization or person, and their payment. Users may access a funding source's draw history at any point in time.

The asset module 254 may be configured to enable users to enter information for assets related to a program or project. The asset module 254 may enable users to track and manage assets including their depreciation and/or useful life. In addition, asset module 254 may enable options to determine or calculate the replacement cost of the asset. Tracking any refurbishment or other activity that extends the life of the program or project may also be performed.

The assets module 254 may also provide options and tools for closing a project and its subsequent conversion to a fixed asset. For instance, once a project or program is completed, an organization may be left with one or more capital assets.

The entity module 255 may be configured to enable users to enter and track one or more entities related to a program, project, contract, asset, funding source, or other items. Entities module 255 may provide a virtual database or contacts file for all entities involved in a program. Users may input and "link" one or more entities to any other item(s).

Entities may be internal or external to the user and may include organizations and/or people. These may include one or more parties that enter into contracts, supply funding, or otherwise interact with the user, such as different companies, governmental agencies and individuals. The entity module 255 may be configured to store and track information regarding an entity, such as, name, type status, federal tax ID (for a business), classification; people, address(es); and/or contact information.

Individuals may also be associated with an organization, such as, for example, owners, officers, project/program manager(s), administrators, or other positions. Contact information for entities may include telephone numbers for voice and fax, email addresses, physical addresses, and Web-sites. Web-related information may be stored as interactive links (such as an email address or a URL) that users may "click" on to navigate to a specified address.

Entities may be tracked by their type. For organizations, the type may be federal, state, or local government, construction or engineering firm. Other information may be stored such as ownership status (e.g., minority owned or local owned). Individuals may have other types associated with them. Users may have options to customize the entities type as desired.

The allocate module 256 may be configured to enable users to specify and allocate expense amounts across multiple projects of a program. Users may have the options to define how money should be allocated over projects so the process can be repeated. For example, money may be allocated as an expense, or income, over multiple projects. This may occur on a frequent basis.

Users may also be able to define an allocation type, which specifies the projects to allocate the costs over. This may be by a project search criteria, a contract or a funding source. In addition, the user may be able to specify whether the source of the cost to be allocated is to be input or if it is to come from a fiscal schedule.

Allocate module 256 may also be configured to initialize the allocation of cost across selected projects. In some implementations, formulas may be provided, which users can select, that may be used to allocate amounts over selected projects.

For example, users may have options to calculate and allocate capitalized interest across projects that are associated with a particular funding source. This provides a more accurate and efficient means for calculating interest for stakeholders, such as bond holders.

The history of previous allocations that have been executed may be tracked and viewed. Such information may include: the date an allocation was executed; current state of executions (e.g., pending or applied); the user who executed the allocation, date assigned to expense items created, amount to be allocated, number of projects impacted, and/or amount remaining unallocated.

The reporting module 257 may be configured to enable users to generate various reports. Comprehensive reporting capability may permit users to rapidly extract and present information related to projects, not only for the day-to-day management of the project, but also to inform internal management and external entities, such as grant providers and bond holders. The reports may be presented in a printable format, and/or an electronic format.

The reporting module 257 may be configured to report, by invoices or invoice line item, the expenses that have been paid from a particular funding source. This helps provide increased transparency.

In some implementations, the reporting module 257 may generate reports that need to be submitted to the government or other organizations, to satisfy regulatory requirements, such as FAA reports on a quarterly basis. Customizable reporting options for users may also be provided. In addition to the reports detailed below, the system may support ad hoc reporting.

The following reports are exemplary and it will be appreciated other reports may be similarly generated.

A Monthly Capital Budget (MCB) Report may include monthly capital budgeting information for a program or project. This report may show the descriptive information about one or more of the following: (i) projects; (ii) statuses; (iii) budgets to date; (iv) expenses to date; (v) encumbrances; (vi) pre-encumbrances; (vii) remaining budget; (viii) percent of budget committed; and (ix) funding sources.

A Project Summary Report may provide summary information about a project. This report may include descriptive information about one or more of the following: (i) project number; (ii) project name; (iii) project type; (iv) project status; (v) project manager; (vi) projected completion date; (vii) estimated project completion cost; and (viii) total funding associated with the project. Users may be able to limit the projects shown on this report by project type, project status, project manager, or other parameter.

A Project Detail Report may provide a more comprehensive summary of project information than the project summary report. This report may include descriptive information about one or more of the following: (i) core project information; (ii) schedule information; (iii) forecast and expenditures; (e.g., forecast cost of project; pre-encumbered items for project; encumbered items for the project; and/or invoices items for the project); (iv) funding (e.g., funding source name, funding source description, amount of funding source applied to project, and/or total draws against funding source associated with project); and (v) contracts (e.g., contract number, contract description, contract amount and/or change order amount). Users may be able to select to run this report by project type, project manager, project status, or other parameter, if so desired.

A Funding Summary Report may summarize the funding sources being tracked. This report may include one or more of the following information: (i) funding source name; (ii) funding source description; (iii) funding source type; (iv) funding source status; (v) total amount of funding; and (vi) number of projects associated with the funding source; (vii) date funding granted; (viii) date funding expires; (ix) total amount of draws; and (x) date of last draw. Users may be able to limit the funding sources appearing on this report by funding source status, funding source type, or other parameter, if so desired.

A Funding Source Detail Report may provide more detailed information a funding source than the funding summary report. The report may contain descriptive information about one or more of the following: (i) funding source; (e.g., funding source ID; funding source name; funding source description; funding source type; funding source status; and/or funding source amount); (ii) projects associated with funding (e.g., project number; project name; total project amount; amount funded by this funding source); and (iii) draws (e.g., draw ID number; draw date; and/or draw amount). Users may be able to select the funding sources to include in this report using funding source ID, funding source type, funding source status, or other parameter, if so desired.

A Contract Summary Report may include an overview of contracts for a program. This report may show descriptive information about one or more of the following information: (i) contract number; (ii) prime contractor; (iii) contract type; (iv) contract execution date; (v) initial contract amount; (vi) total amount of change orders; (vii) current contract amount; (viii) change order count; and (ix) total amount invoiced. This report may be selectable by the contract type, or other parameter.

A Contract Detail Report may include more detailed information than the contract summary report. This report may contain descriptive information about one or more of the following: (i) contract (e.g., contract number; prime contractor; contract type; initial contract value; change order value; and current contract value); (ii) project (e.g., project number; project name; project type; and/or project status); (iii) change orders (e.g., change order ID; change order description; change order approver; approval date; and/or change order amount); and (iv) invoices (e.g., invoice number, invoice date, invoice description, invoice amount, payment date). This report may allow users to limit the contracts displayed in the report by the contract number, prime contractor, the contract type, or other parameter, if desired.

The tools module 258 may be configured to enable users to perform various actions regarding programs. These may include, among others, forecasting and planning tools.

Forecasts of costs is an important feature for each program and/or project through its lifecycle. The estimated and actual expenditures of each may be tracked through its lifecycle to determine financial performance. This may be performed through the use of project completion estimates, budgeting, expense tracking tools, or the like, as known in the art. These tools may not only forecast through completion or the project or program, but also permit the history of the forecast and estimates to be examined and analyzed.

Tools enable the budget associated with a program or project to be tracked through its lifecycle. This may include what has been approved and what has been adopted. The budget may be tracked, such that users may view changes that have been made over the life of the program or project. Change orders may include budget changes. If a change to the budget is a result of a change order, then the user may be able to see a link between the change order and the budget impact. The budget may be tracked at different levels of detail for various users. For purchases, users may have options to view the total amounts related to each of requisitions, purchase orders, invoices and payment, at any instance, to more effectively manage a project or program.

In some implementations, tools module 258 may also provide users with an option for generating mailing labels. The mailing labels may contain label-oriented name and address information, as selected by the user.

In some implementations, security features may be provided to limit access. Different users may have different login and passwords. For different users, different levels of access may be provided. A user administrator may have options to provide user accounts with full or limited access rights. Security features may be provided that limit and/or prohibit certain users from entering or modifying data fields. An audit trail may track and monitor user action.

FIGS. 3-6 depict exemplary screenshots of some of the functionalities of the program management application 250. The program management application 250 may be a web-based application which is generated in a graphical user interface (GUI) of a browser application, such as MS Internet Explorer®, Apple Safari®, Mozilla®, Opera®, etc. The GUI may be generated on a display device, such as a monitor or screen, and include various buttons, checkboxes, scrollbars, dropdown menus, text boxes, or the like, to facilitate user interaction. Other capabilities may also be included, which may not be shown, but are known in the art. Users may use peripheral devices, such as, keyboard, mouse, touchscreen, light pen, stylus, or the like, to input data, as known in the art.

Figure 3:
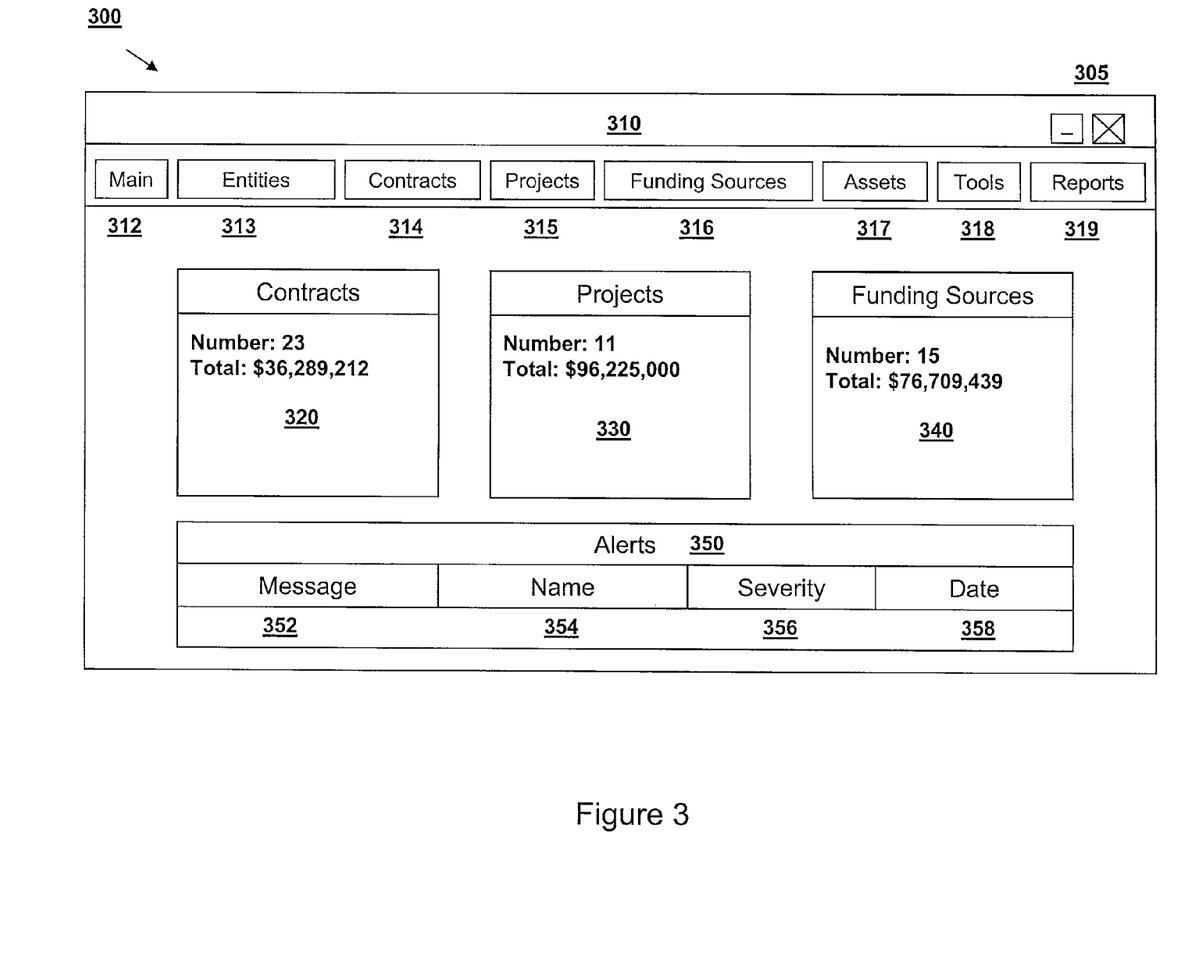
FIG. 3 illustrates an exemplary main menu screenshot of a program management application according to an aspect.

FIG. 3 illustrates an exemplary main menu screenshot 300 of the program management application according to an aspect. This screen may represent the main page or home page. In some implementations, users may be prompted for a login and password before accessing the application.

The main menu screen 300 may include global controls 305, main tool bar 310, and various summaries panes, such as contracts summary pane 320, projects summary pane 340 and funding sources summary pane 340. Global controls 305 may include minimize/maximize functions, as shown, among others, as would be appreciated in the art, such as file management options.

Main tool bar 310 may include various functionalities such as main menu return 312, entities input 313, contracts input 314, projects input 315, funding sources input 316, assets input 317, other tools 318, and reports generation 319. Additional functionalities may also be provided, as needed; and not all functionalities may be provided. Based on a user selection, the user may be directed to a particular tool or functionality. This may include, for instance, navigating to a different page or different portion within the same page, generating a pop-up window, opening a new browser window, opening a related application, etc. The theme of the main menu screen 300, such as the main tool bar 310, color schemes, text, font, customization (i.e., icons, and logos), etc., may in some instance, be displayed in subsequent pages.

The contracts summary pane 320 may provide a depiction of the various contracts which a program includes. Contracts summary pane 320 may include information, such as, the number of contracts involved and the total money to be allocated by all contracts. A listings of the various contracts may also be shown. In some implementations, contracts summary pane 320 may also include statistical and/or graphical data depiction. For instance, a pie chart may be used to depict contract monies as a portion or the total.

The projects summary pane 330 may provide a depiction of the various projects which a program includes. The projects may include, but are not necessarily limited to purchase, design, and constructions projects. Projects summary pane 330 may include information, such as, the number of projects and the total monies for a program. This may include monies allocated, estimated, and/or spent. More, the summary may provide the status of the projects, for instance, active, close-out, and planning. This information may be depicted using various statistical and/or graphical forms, such as graphs or charts. A listings of the various projects may also be shown therein.

Funding sources summary pane 340 may provide a depiction of the various funding sources for a program. The funding sources may include sources of income, such as bonds, grants, loans, or other allotted funds. Funding sources summary 340 may include information, such as, the number of projects sources and the total money for a program. This information may be depicted using various statistical and/or graphical forms, such as graphs or charts. For instance, a pie chart may be used to depict funding sources monies as a portion or the total, and/or by type of allotment. A listing of the various funding sources may also be shown.

Users may be provided with options to customize the information depicted in one or more the summary panes. This may include the ability to select the data displayed therein, summary information calculations, and/or other display features, such as selecting a graphical form.

An alerts feature 350 may provide users with important information regarding a program. The alerts may include an alert message 352, a name 354 of party who generated the message, sensitivity level 356 of the alert, and date 358 of the alert. Such alerts may include information regarding the availability of monies, and/or various changes that may affect the program (e.g., change orders, breach of contract, litigation, natural disaster, etc.). The list may be updated, as alerts are received.

Figure 4:
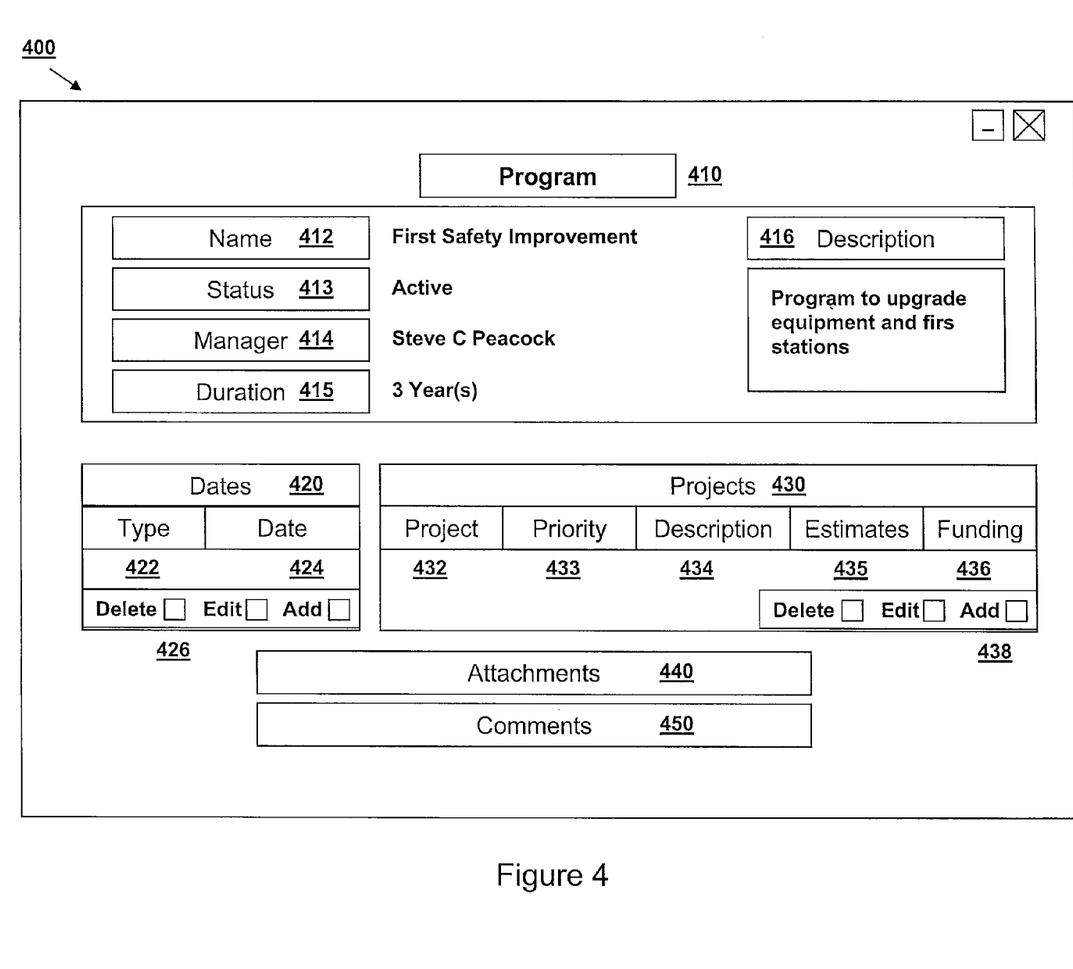
FIG. 4 illustrates an exemplary screenshot showing program function of a program management application according to an aspect.

FIG. 4 illustrates an exemplary screenshot 400 showing a program function of the application according to an aspect. Program function allows users to define and edit a program. This includes the ability to group together one or more projects into a program. Users may also edit, or delete one or more projects, if desired.

Users may input program name 412, program status 413, program manager 414, program manager 415, and a brief description 416 of the program.

In addition, a date field 420 may be provided for enabling users to enter key or important dates associated or related to a program. These date types may include, for instance, the scheduled start date, the scheduled complementation date, and any other milestones. A listing may show dates by type 422 and dates 424. Users may have options 426 to add, delete or edit the dates, and sort them by type or date, if desired.

Projects pane 430 enables one or more projects that constitute a program to be entered. Users may input a project 432, priority 433, description 434, estimates amount 435, and funding amount 436 for each project. Users may have options 438 to add, delete or edit the dates, and sort them by type, date, or other parameter, if desired.

One or more attachments may be uploaded or associated with a program. For instance, users may be able to attach document, drawings, and other external files to a project and/or program. A listing of attachments 440 may displayed. In response, to a user selecting an attachment, it may retrieved and/or loaded for viewing or other actions.

In addition, users may post comments related to the program. As comments are posted, a listing of comments 450 may be provided. In response, to selecting a comment, it may be retrieved and/or loaded for view or other actions.

Figure 5:
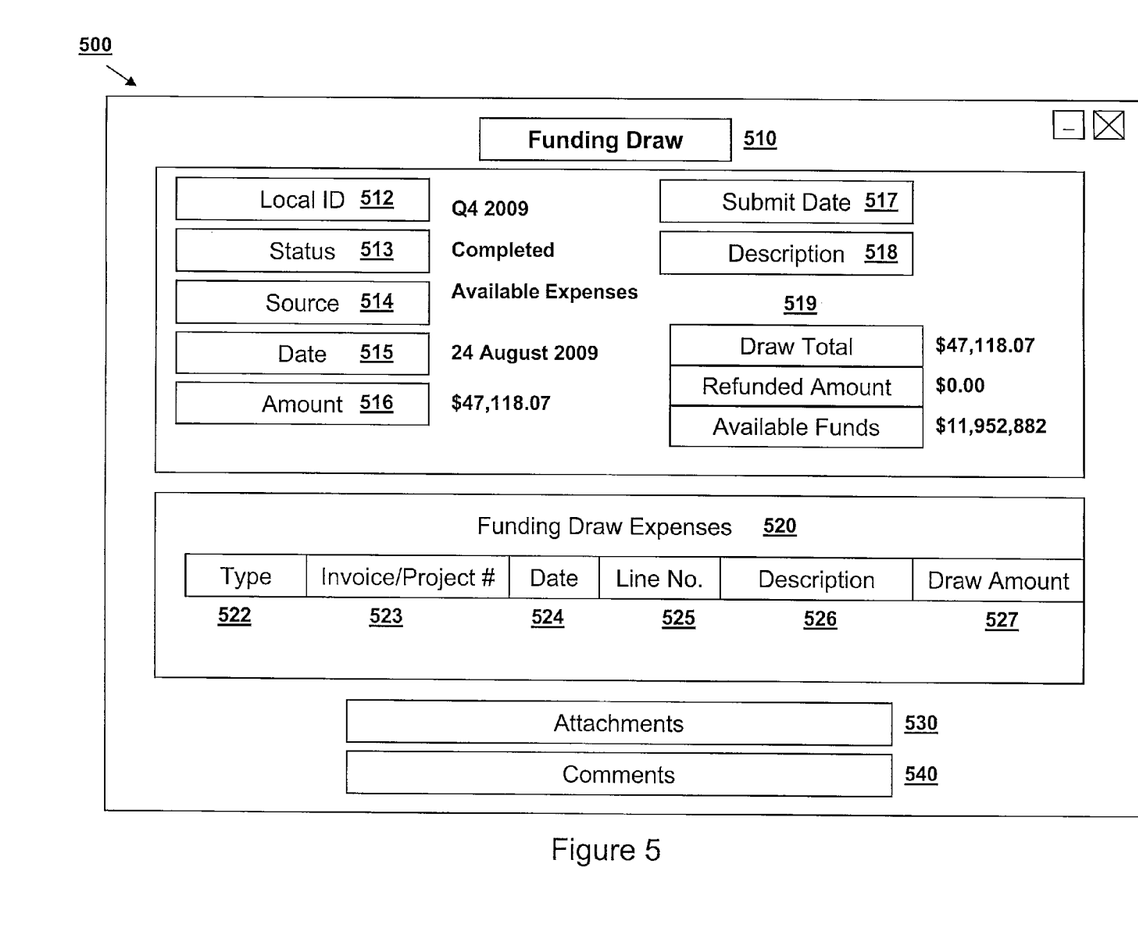
FIG. 5 illustrates an exemplary screenshot showing a fund-drawing function of a program management application according to an aspect.

FIG. 5 illustrates an exemplary screenshot 500 showing a fund-drawing function of the application according to an aspect. Users may input expenses for invoice or other expense payments.

For instance, users may input a local identification ID 512, status 513, source of funding 514, payment due date 515, amount 516, submit date 517, and description 518.

Summary funding data pane 519 may be generated for the current draw. Summary funding data pane 519 may depict the draw total, refunded amount (if any) and total available funds from the funding source 514.

A listing 520 of funding draw expenses, to date, for the program is shown. The listing 520 may include draw type 522, specific invoice/project number 523, date of draw 524, invoice line number 525, description 525, and draw amount 526. These may be sorted by date, invoice/projects, or other parameter, if desired.

One or more attachments may be uploaded or associated with a program. A listing of attachments may be shown in field 530. In response, to a user selecting an attachment, it may be retrieved and/or loaded for the user to view.

In addition, users may have an option to post comments. A listing of comments 540 may be provided. In response, to a user selecting a comment, it may be retrieved and/or loaded for the user to view.

Figure 6:
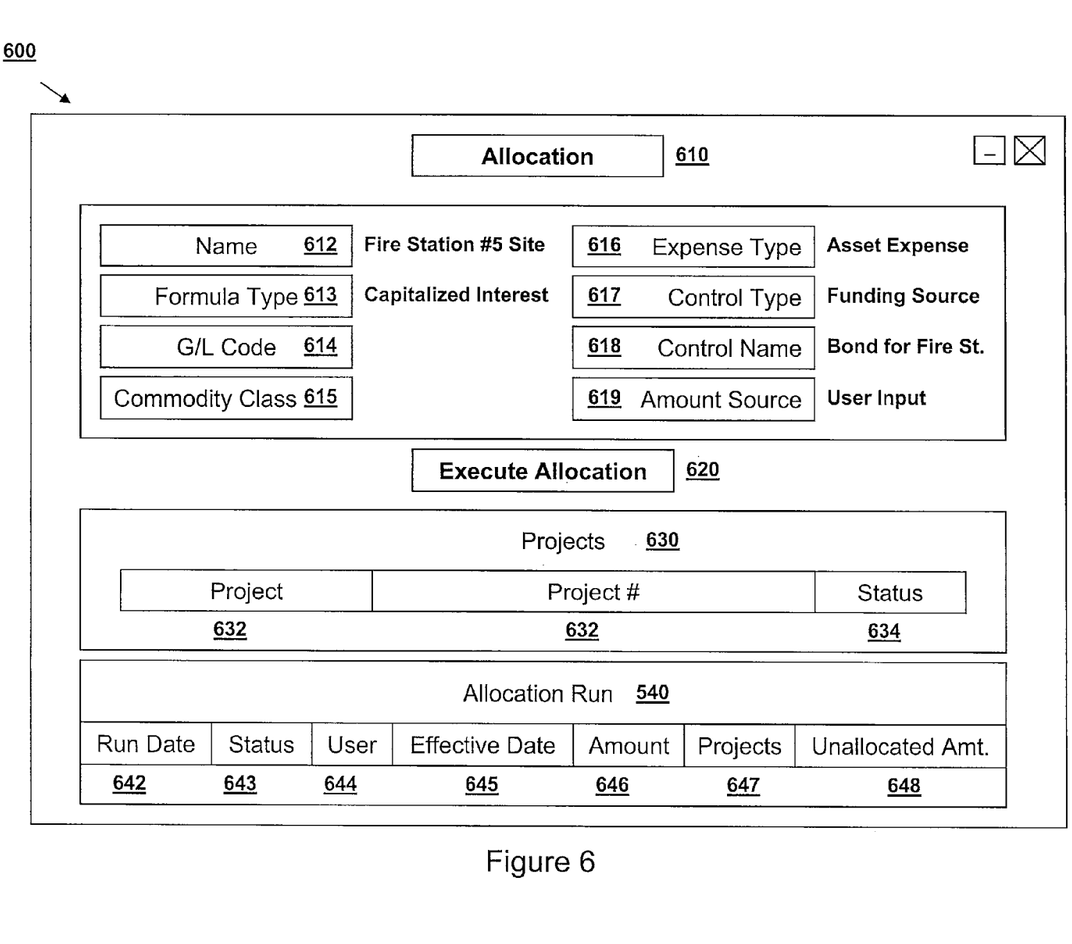
FIG. 6 illustrates an exemplary screenshot showing an allocation of expense function of a program management application according to an aspect.

FIG. 6 illustrates an exemplary screenshot 600 showing an allocation of expense function of a program management application according to an aspect.

Users may enter input regarding an allocation for a program. This information may include, but is not necessarily limited to, program name 612, formula type 613, General Ledger (G/L) Code(s) 614, commodity class 615, expense type 616, control type 617, control name 618 and amount source 619. Upon selection of an "Execute Allocation" command 620, by the user, an allocation may then be executed according to the user-input parameters. Execute Allocation command 620 may be a user-selectable element or similar feature. As shown, the command 620 may be a user-selectable button.

Projects pane 630 shows a listing of projects 632, and its project number 632 and status 634 for each project associated with a program.

Allocating Run pane 640 displays summary information for each allocation that has been performed. This information may include run date 642, status 643, user 644 who made allocation, effective date of allocation 645, amount 646, number of projects 647 involved, and the total unallocated amount 648.

Figure 7:
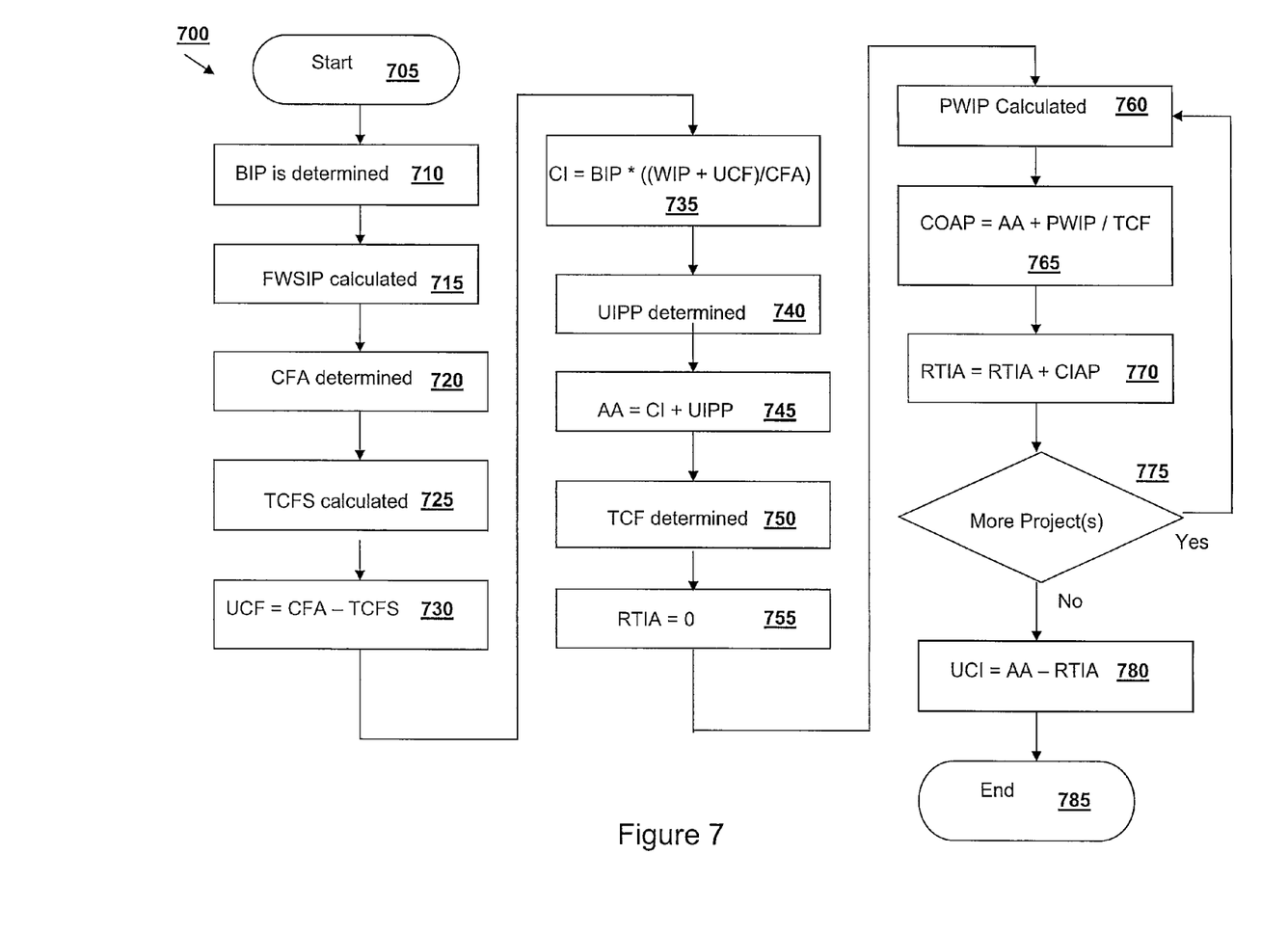
FIG. 7 shows a flowchart of one process for calculating capitalized interest across projects associated with a funding source according to an aspect.

FIG. 7 shows a flowchart of one process 700 for calculating capitalized interest across projects associated with a funding source according to an aspect.

This may be thought of as a multi-step process where the total amount of capitalized interest is calculated, then that amount is distributed to the associated projects.

The process begins in step 705. Next, in step 710, the amount of the bond interest payment (BIP) is determined. For instance, if the amount source is a fiscal schedule, an amount item with a date matching the effective date of payment may be used as the BIP. Otherwise, this BIP could be input by a user.

In step 715, the funding source work in progress (FSWIP) is calculated by determining the sum of all the expenses that are associated with draws' from this funding source, and are not associated with an asset. This is because "assetized" components are not included in capitalized interest calculations.

Continuing to step 720, the current funds available (CFA) from the funding source are determined. These may include constructions funds. And in step 725, the total constructions funds spent (TCFS) on this funding source are calculated by determining the sum of all the expenses that are associated with draws from this funding source. This may include those associated with an asset.

In step 730, unspent construction funds (UCF) are calculated by subtracting TCFS from CFA. Next, in step 735, capitalized interest (CI) is calculated by first adding FSWIP and UCF, then dividing the resultant sum by CFA and then multiplying the answer by BIP.

In step 740, the unallocated interest from the past periods (UIPP) is determined. This value may have been generated from previous runs. If there has not been a previous run, than this amount may be set to zero.

Continuing to step 745, the allocation amount (AA) is calculated by adding CI and UIPP. In step 750, the Total Construction Funds (TCF) is determined. This may be the total amount of the funding source work in progress and the unspent construction funds. In step 755, a running total of interest allocated (RTIA) is maintained. Initially, RTIA may be set to zero.

Then, for each project assigned to a funding source the following steps may be performed. In step 760, the project work in progress for funding source (PWIP) is calculated. This is the sum of all the expenses for this particular project that are associated with draws from this funding source, and are not associated with an asset. In step 765, the capitalized interest to allocate to the project (CIAP) is calculated by dividing the (PWIP) by the (TCF) then multiplying by the (AA). RTIA is then updated by adding CIAP to the previous value of RTIA in step 770.

At step 775, a decision is made whether there is one or more projects remaining. If so, the process returns to step 760 for the next project. If or when there are no more projects left to consider, in step 780, the capitalized interest (UCI) is calculated by subtracting the RTIA from the AA.

The process ends in step 785. Once calculated, the capitalized interest for that funding source may be allocated.

Other embodiments, uses and advantages of the inventive concept will be apparent to those skilled in the art from consideration of the above disclosure and the following claims. The specification should be considered non-limiting and exemplary only, and the scope of the inventive concept is accordingly intended to be limited only by the scope of the following claims.

What is claimed is:

1. A non-transitory computer-readable storage medium having computer instructions for facilitating project management stored therein, the instructions when executed by a processor configure the processor to:

receive an identification of a project comprising a plurality of project expenses and receive an identification of a plurality of funding sources that are each used to fund different ones of the plurality of project expenses;

allocate each of the plurality of project expenses to one or more of the plurality of funding sources based on the identification of the plurality of funding sources that are each used to fund different ones of the plurality of project expenses;

receive a request to fund a project expense;

determine which one or more of the plurality of funding sources are allocated to fund the project expense;

generate a funding draw request that causes the project expense to be funded by the determined one or more of the plurality of funding sources;

for at least one funding source among the determined one or more of the plurality of funding sources, determine:

a bond issue payment;

an amount of funding source work in progress based on a sum of the project expense and at least one other expense associated with one or more draws from the one funding source but not associated with an asset;

an amount of current funds available;

an amount of unspent project funds based on the amount of current funds available from the at least one funding source and a total amount of project funds spent from the at least one funding source; and a capitalized interest based on the determined bond issue payment, the amount of funding source work in progress, the amount of unspent project funds, and the amount of current funds available; and allocate at least a portion of the capitalized interest to the project.

2. The non-transitory computer-readable storage medium according to claim 1, wherein the instructions further configure the processor to:

receive contract information related to the project.

3. The non-transitory computer-readable storage medium according to claim 1, wherein the instructions further configure the processor to:

receive information related to a plurality of assets of the project.

4. The non-transitory computer-readable storage medium according to claim 3, wherein the instructions further configure the processor to:

manage an asset depreciation of an asset, a useful life of the asset, or a replacement value of the asset.

5. The non-transitory computer-readable storage medium according to claim 3, wherein the instructions further configure the processor to:

change a status of the project to an asset.

6. The non-transitory computer-readable storage medium according to claim 1, wherein the instructions further configure the processor to:

receive one or more organizations or individuals associated with the project.

7. The non-transitory computer-readable storage medium according to claim 1, wherein the instructions further configure the processor to:

transfer an amount of money between the plurality of funding sources.

8. The non-transitory computer-readable storage medium according to claim 1, wherein the instructions further configure the processor to:
 generate one or more reports.

9. The non-transitory computer-readable storage medium according to claim 8, wherein the instructions further configure the processor to:
 report, by an invoice or an invoice line item, the project expense that was funded from the determined one or more of the plurality of funding sources.

10. The non-transitory computer-readable storage medium according to claim 1, wherein the instructions further configure the processor to:
 calculate an amount of capitalized interest for the project.

11. The non-transitory computer-readable storage medium according to claim 1, wherein the instructions further configure the processor to:
 track a plurality of schedules for the project.

12. The non-transitory computer-readable storage medium according to claim 11, wherein the instructions further configure the processor to:
 import scheduling information from another application.

13. The non-transitory computer-readable storage medium of claim 1, wherein the capitalized interest is determined based on a quotient resulting from the sum of the amount of funding source work in progress and the amount of unspent project funds divided by the amount of current funds available.

14. The non-transitory computer-readable storage medium of claim 13, wherein the capitalized interest is determined based further on the quotient multiplied by the amount of the bond interest payment.

15. The non-transitory computer-readable storage medium of claim 1, wherein the amount of the unspent construction funds is determined based on a difference between the total construction funds spent and the current funds available.

16. A computer-implemented method for facilitating project management, comprising the following operations:
 receiving, by one or more processors configured with one or more computer program modules, an identification of a project comprising a plurality of project expenses and an identification of a plurality of funding sources that are each used to fund different ones of the plurality of project expenses;
 allocating, by the one or more processors, each of the plurality of project expenses to one or more of the plurality of funding sources based on the identification of the plurality of funding sources that are each used to fund different ones of the plurality of project expenses;
 receiving, by the one or more processors, a request to fund a project expense;
 determining, by the one or more processors, which one or more of the plurality of funding sources are allocated to fund the project expense;
 generating, by the one or more processors, a funding draw request that causes the project expense to be funded by the determined one or more of the plurality of funding sources;
 for at least one funding source from among the determined one or more of the plurality of funding sources, determining, by the one or more processors:
  a bond issue payment;
  an amount of funding source work in progress based on a sum of the project expense and at least one other expense associated with one or more draws from the one funding source but not associated with an asset;
  an amount of current funds available from the at least one funding source;
  an amount of unspent project funds based on the amount of current funds available from the at least one funding source and a total amount of project funds spent on the one funding source; and
  a capitalized interest based on the determined bond issue payment, the amount of funding source work in progress, the amount of unspent project funds, and the amount of current funds available; and
 allocating, by the one or more processors, at least a portion of the capitalized interest to the project.

17. The computer-implemented method of claim 16, the operations further comprising:
 receiving, by the one or more processors, identifications of a plurality of projects each comprising respective plurality of project expenses; and
 allocating, by the one or more processors, each of the respective plurality of project expenses to one or more of the plurality of funding sources.

18. The computer-implemented method of claim 17, the operations further comprising:
 grouping, by the one or more processors, the plurality of projects into a program that is associated with the plurality of funding sources, wherein the grouped plurality of projects are related to one another.

19. The computer-implemented method of claim 17, the operations further comprising:
 receiving, by the one or more processors, a request to determine capitalized interest for a particular funding source;
 determining, by the one or more processors, at least a first project and a second project that that are allocated to the particular funding source; and
 calculating, by the one or more processors, the capitalized interest for the particular funding source based on the first project and the second project.

20. The computer-implemented method of claim 16, wherein the determined one or more of the plurality of funding sources are associated with a requirement that must be satisfied prior to funding a project expense, the operations further comprising:
 determining, by the one or more processors, whether the requirement has been satisfied; and
 rejecting or approving, by the one or more processors, the funding draw requested based on the whether the requirement has been satisfied.

21. The computer-implemented method of claim 20, wherein the requirement comprises required documentation.

22. The computer-implemented method of claim 21, the operations further comprising:
 receiving, by the one or more processors, the required documentation via a file upload; and
 determining, by the one or more processors, that the requirement has been satisfied based on the file upload.

23. The computer-implemented method of claim 20, the operations further comprising:
 receiving, by the one or more processors, a request to view the requirement; and
 communicating, by the one or more processors, the requirement based on the request.

24. The computer-implemented method of claim 16, the operations further comprising:
 for each of the plurality of funding sources, generating, by the one or more processors, a report comprising a draw history that includes a history of funding draws made for each of the plurality of funding sources.

25. The computer-implemented method of claim 23, wherein the draw history comprises a funding date or a disbursement date for the funding draws.

26. The computer-implemented method of claim 16, wherein the capitalized interest is determined based on a quotient resulting from the sum of the amount of funding source work in progress and the amount of unspent project funds divided by the amount of current funds available.

27. The computer-implemented method of claim 26, wherein the capitalized interest is determined based further on the quotient multiplied by the amount of the bond interest payment.

28. The computer-implemented method of claim 16, wherein the amount of the unspent construction funds is determined based on a difference between the total construction funds spent and the current funds available.

29. A computer-implemented system for facilitating project management, comprising:
   one or more processors of a computing device configured to:
      receive an identification of a project comprising a plurality of project expenses and an identification of a plurality of funding sources that are each used to fund different ones of the plurality of project expenses;
      allocate each of the plurality of project expenses to one or more of the plurality of funding sources based on the identification of the plurality of funding sources that are each used to fund different ones of the plurality of project expenses;
      receive a request to fund a project expense;
      determine which one or more of the plurality of funding sources are allocated to fund the project expense;
      generate a funding draw request that causes the project expense to be funded by the determined one or more of the plurality of funding sources;
      for at least one funding source among the determined one or more of the plurality of funding sources, determine:
         a bond issue payment;
         an amount of funding source work in progress based on a sum of the project expense and at least one other expense associated with one or more draws from the one funding source but not associated with an asset;
         an amount of current funds available available from the at least one funding source;
         an amount of unspent project funds based on an amount of current funds available from the at least one funding source and a total amount of project funds spent on the one funding source; and
         a capitalized interest based on the determined bond issue payment, the amount of funding source work in progress, the amount of unspent project funds, and the amount of current funds available; and
      allocate at least a portion of the capitalized interest to the project.

30. The system of claim 29, wherein the capitalized interest is determined based on a quotient resulting from the sum of the amount of funding source work in progress and the amount of unspent project funds divided by the amount of current funds available.

31. The system of claim 30, wherein the capitalized interest is determined based further on the quotient multiplied by the amount of the bond interest payment.

32. The system of claim 29, wherein the amount of the unspent construction funds is determined based on a difference between the total construction funds spent and the current funds available.

* * * * *